O. F. FOGELSTRAND.
Twine-Boxes.
No. 146,999. Patented Feb. 3, 1874.
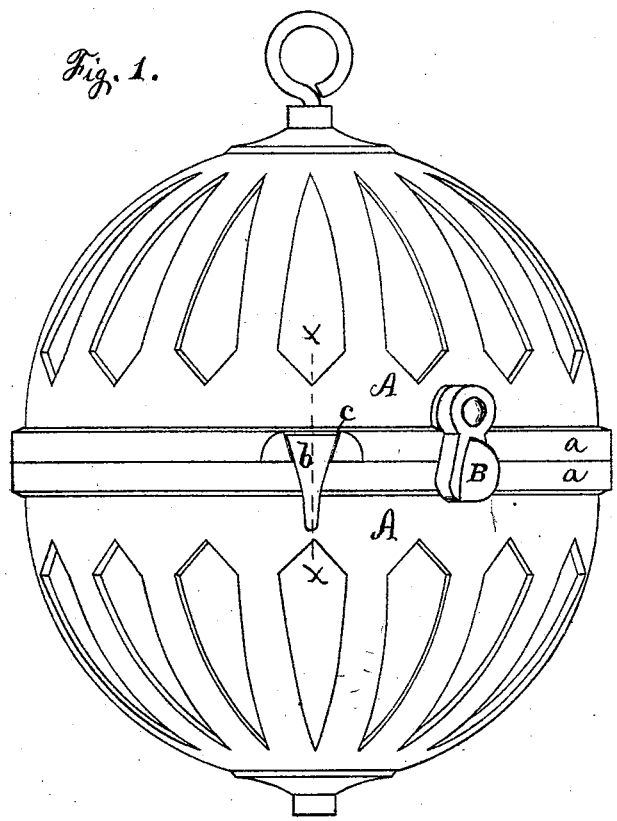
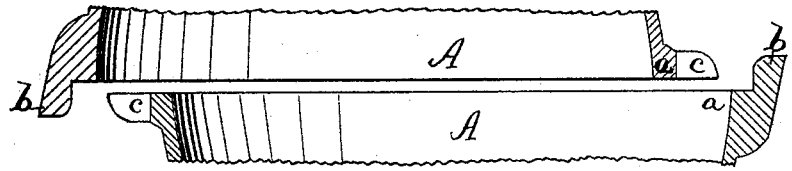

UNITED STATES PATENT OFFICE.

OTTO F. FOGELSTRAND, OF KENSINGTON, CONNECTICUT, ASSIGNOR TO HART, BLIVEN & MEAD MANUFACTURING COMPANY, OF SAME PLACE.

IMPROVEMENT IN TWINE-BOXES.

Specification forming part of Letters Patent No. 146,999, dated February 3, 1874; application filed June 30, 1873.

*To all whom it may concern:*

Be it known that I, OTTO F. FOGELSTRAND, of Kensington, in the county of Hartford and State of Connecticut, have invented certain new and useful Improvements in Twine-Boxes, of which the following is a specification:

In my improved twine-box there are two semi-cylindrical shells or halves, each provided with a dovetailed tenon, and one shell is provided with a button for securing the two halves of the twine-box in place while the dovetails hold them together, thus forming a convenient twine-box, which can be readily opened and closed, as hereafter described.

In the accompanying drawing, Figure 1 is a side elevation of a twine-box which embodies my invention; and Fig. 2 is a vertical section of the same where the hemispheres are united on line $x\,x$ of Fig. 1, detached.

A A designate the two semi-cylindrical shells or halves of a twine-box, the main portion of which may be of any desired pattern. On the rim $a$ of each half I form a dovetail tenon, $b$, and a corresponding recess or slot, $c$, the same being formed immediately opposite each other, and just alike upon both halves A A. Upon the rim $a$ of one half I secure a button, B.

In order to put the parts together, the two halves are placed with their rims toward each other, as shown in Fig. 2, and then moved laterally, so as to insert each of the tenons $b$ in the recesses $c$, when said dovetail portions will hold the halves against each other, and, turning the button B, as shown in Fig. 1, will secure the parts from slipping laterally, so as to disengage the dovetails, and thereby the dovetails and button form a cheap and convenient fastening or means of opening and closing the twine-box for the insertion of twine.

I claim as my invention—

The improved twine-box herein shown and described, consisting of the two semi-cylindrical shells A A, dovetail tenons and recesses $b\,c$, $b\,c$, and the button B, substantially as and for the purposes described.

OTTO F. FOGELSTRAND.

Witnesses:
  E. W. MORGAN,
  THERON UPSON.